Patented Nov. 2, 1937

2,097,744

UNITED STATES PATENT OFFICE 2,097,744

METHOD FOR THE ISOMERIZATION OF PINENE

Donald H. Sheffield, Brunswick, Ga., assignor to Hercules Powder Company, Wilmington, Del., a corporation of Delaware No Drawing. Application November 15, 1934, Serial No. 753,131

7 Claims. (Cl. 260—167)

This invention relates to methods for the isomerization of pinene, as, for example, alpha-pinene, beta-pinene, etc.

It is known that a pinene, as alpha-pinene, beta-pinene, etc., can be isomerized to terpene hydrocarbons of greater commercial value than pinene, as, for example, dipentene, terpinene, terpinolene, etc., by treatment with sulfuric acid. Such treatment, however, results in substantial polymerization of the terpene hydrocarbons, poor yields of the desired isomerization products, and production of dark colored products of relatively low value.

In accordance with this invention it has been found that a pinene, as alpha-pinene, beta-pinene, etc., can be readily isomerized with the resultant production of dipentene, terpinene, terpinolene, etc. by treatment with a relatively strong organic acid, such as, for example, formic acid, acetic acid, or other organic acid equivalent therefor, or with phosphoric acid, or with mixtures of such agents. Treatment of pinene in accordance with this invention results in a high yield of isomerization products possessing excellent color, and undesirable polymerization reactions are substantially avoided. Isomerization of pinene in accordance with this invention will desirably be effected by treatment of the pinene, either as such or in solution in a solvent which will not enter into the reaction, as, for example, gasoline, benzene, toluene, etc., with from about 5 to 15% by weight of the isomerization agent, as, for example, phosphoric acid, acetic acid, formic acid, etc., or mixtures thereof. These proportions are, however, not critical and merely represent desirable values if the best yields are to be obtained. Preferably the isomerization treatment will be carried out at an elevated temperature in order to obtain a commercially practical reaction rate. A temperature of from about 70° to about 100° C. will, for example, be suitable, if the reaction is carried out at atmospheric pressure. If desired the reaction may be carried out at superatmospheric pressure and where formic acid or acetic acid is used as the isomerization agent such procedure will be preferred. A pressure of from 4 to 5 atmospheres and a temperature range of 125° to 150° C. is suitable. In order to promote efficient contact between the two phases which may be present during the reaction, it will be desirable to provide efficient agitation during treatment. It will be appreciated that no particular form of apparatus is necessary to carry out the process.

For most satisfactory results the isomerizing acids should be used in concentrated form. Thus, desirably, the phosphoric acid will be about 65–75% concentration, acetic acid 90–100%, and formic acid 90–95%.

The following example is illustrative of practical procedure in accordance with this invention:

2000 g. alpha-pinene and 325 g. of 70% phosphoric acid are agitated together at 75° C. for five hours. The acid is then separated from the mixture, and the terpene portion washed with sodium hydroxide solution. A fractionation of the terpene portion showed that it contained about 85% dipentene, 12% terpinolene and the remainder unidentified polymerization products.

In place of all or part of the phosphoric acid, acetic or formic acid or a mixture thereof may be used in the process above described, the conditions, except that the reaction will desirably be carried out under 4–5 atmospheres pressure where formic or acetic acid is used alone, being otherwise unchanged.

The acid used in the reaction can be recovered for reuse to the extent of about 99% by separation or distillation from the terpene layer after the completion of the reaction. The isomerization product, desirably after being washed with alkali until neutral, may be fractionated for separation into its relatively pure terpene constituents, or may be used or sold as a mixture. The chief constituent of the isomerization product will be dipentene, with terpinene and terpinolene present in much smaller quantities.

It will be understood that the details and examples hereinabove set forth are illustrative only, and in no way limit the invention as herein broadly described and claimed.

What I claim and desire to protect by Letters Patent is:

1. The method of producing dipentene and terpinene by isomerization of a pinene which includes heating a pinene with phosphoric acid at a temperature of from about 70° C. to about 100° C.

2. The method of producing dipentene and terpinene by isomerization of a pinene, which includes heating alpha-pinene with phosphoric acid at a temperature of from about 70° C. to about 100° C.

3. The method of producing dipentene and terpinene by isomerization of a pinene which includes heating beta-pinene with phosphoric acid at a temperature of from about 70° C. to about 100° C.

4. The method of producing dipentene and terpinene by isomerization of a pinene which includes heating a pinene with concentrated phosphoric acid at a temperature of from about 70° C. to about 100° C.

5. The method of producing dipentene and terpinene by isomerization of a pinene which includes heating a pinene with from about 5% to about 15% of its weight of concentrated phosphoric acid at a temperature of from about 70° C. to about 100° C.

6. The method of producing dipentene and terpinene by isomerization of a pinene which includes heating a pinene with a mixture of phosphoric acid and a lower aliphatic acid at a temperature of from about 70° C. to about 100° C., said mixture being capable of effecting substantial isomerization of pinene at the said temperature.

7. The method of producing dipentene and terpinene by isomerization of a pinene which includes heating a pinene with a mixture of phosphoric acid and an organic acid selected from the group consisting of formic and acetic acids at a temperature of from about 70° C. to about 100° C., said mixture being capable of effecting substantial isomerization of pinene at the said temperature.

DONALD H. SHEFFIELD.